Patented Nov. 18, 1941

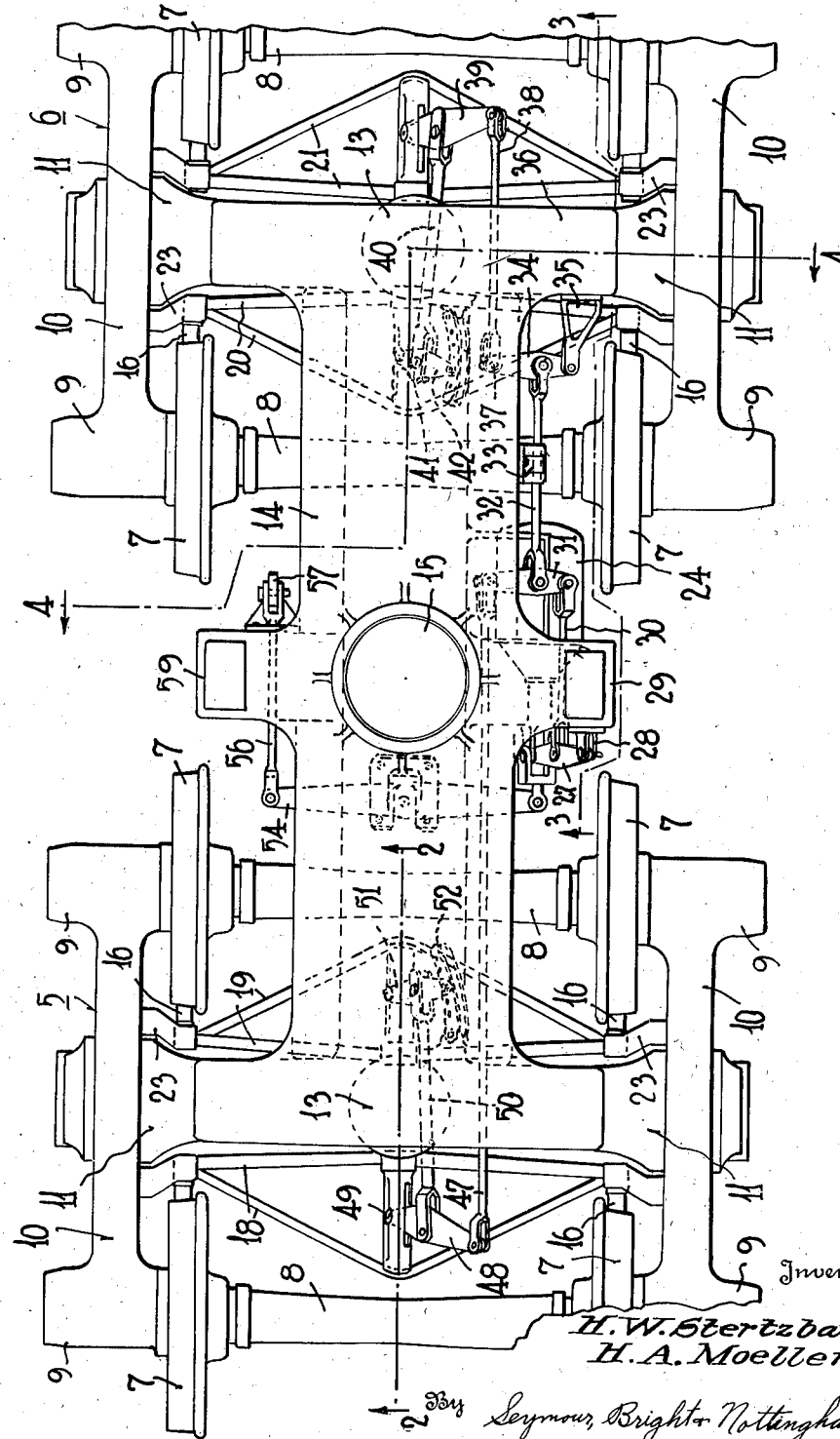

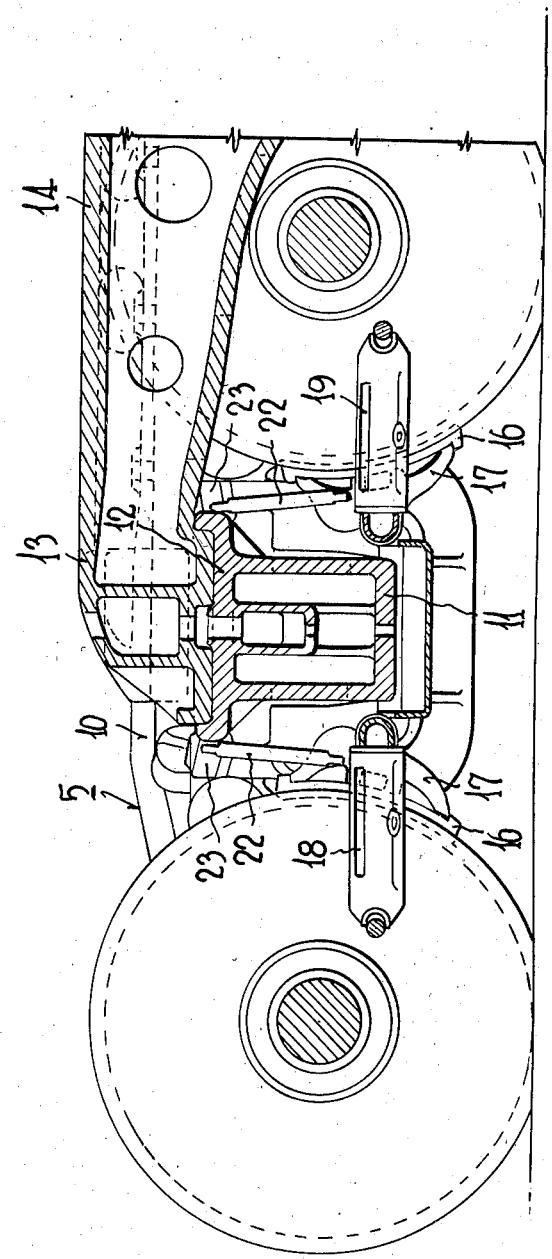

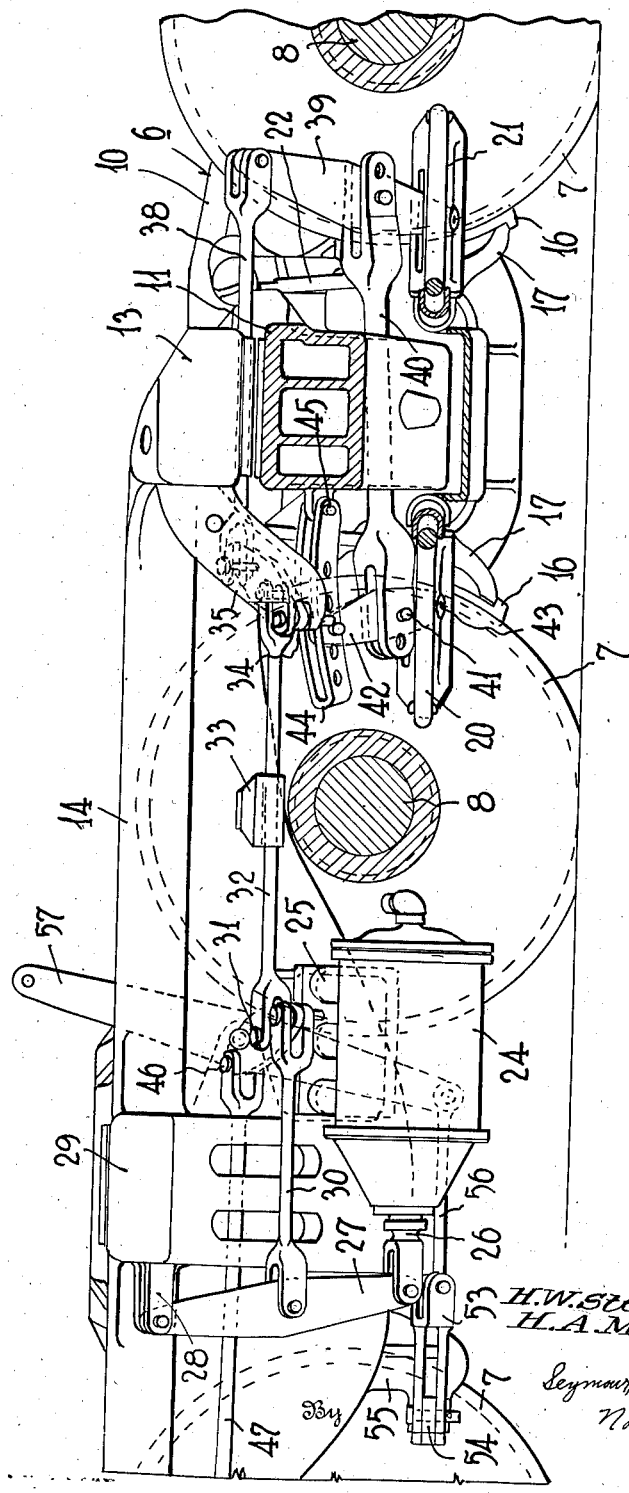

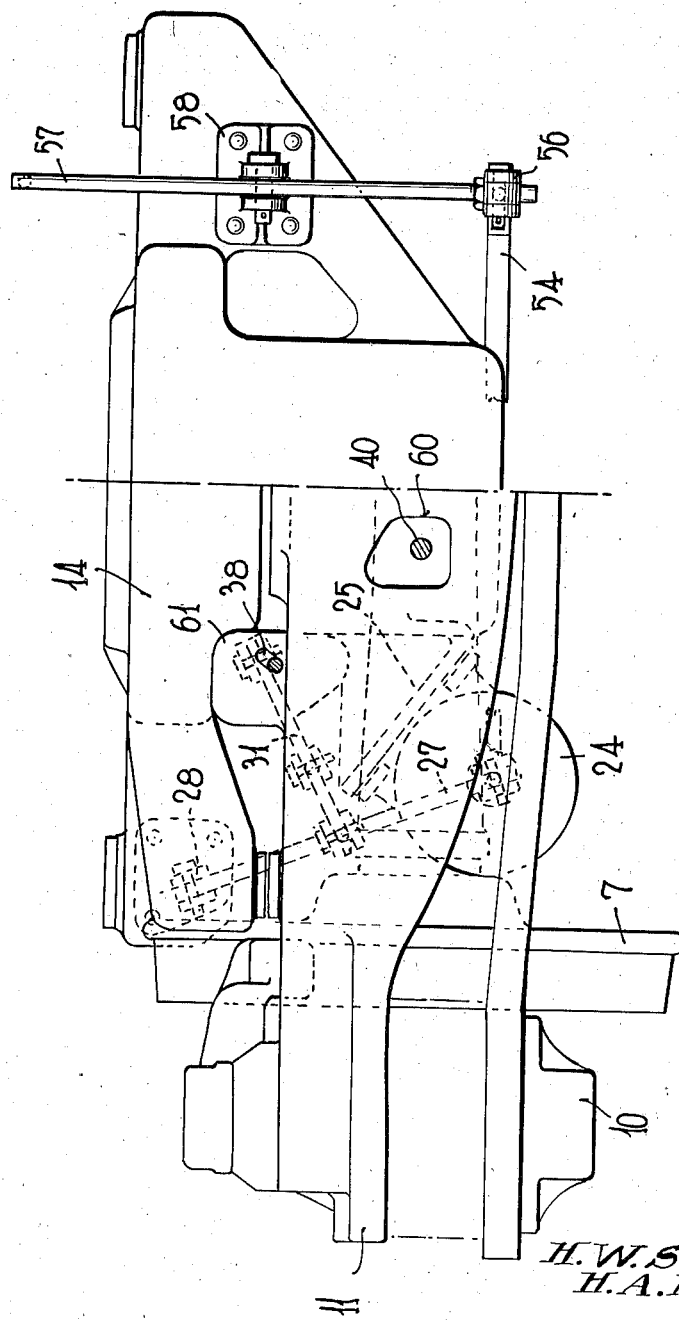

2,263,147

UNITED STATES PATENT OFFICE 2,263,147

BRAKING MECHANISM FOR RAILWAY CAR TRUCKS

Harry W. Stertzbach and Harry A. Moeller, Columbus, Ohio, assignors to The Buckeye Steel Castings Company, Columbus, Ohio Application March 15, 1939, Serial No. 262,024

10 Claims. (Cl. 188—46)

This invention pertains to brake mechanism for railway car trucks and more especially to braking mechanism for eight-wheel trucks.

An object of the invention is to provide a brake mechanism especially adapted for a particular type of truck and in which the air cylinder of the mechanism is carried by the truck, thereby eliminating the long pull rods and levers required when the cylinder is mounted on the body of the vehicle. The elimination of these parts, of course, contributes to the economy of construction and maintenance of the vehicle.

Another object is to supply a braking mechanism particularly applicable to an eight-wheel truck of the double four-wheel type and employing a span bolster. In such a truck the vertical height of the center plate is limited by body and coupler conditions, so that it is necessary to make the brake application without increasing the center plate height and without encroaching upon the space and clearance normally occupied by other parts.

A further object is to furnish in a truck of this character, a span bolster having provision for the air cylinder mounting; brake lever fulcrum brackets; and openings for various pull rods.

With the foregoing objects outlined and with other objects in view which will appear as the description proceeds, the invention consists in the novel features hereinafter described in detail, illustrated in the accompanying drawings, and more particularly pointed out in the appended claims.

In the drawings:

Fig. 1 is a top plan view of an eight-wheel truck provided with one form of our improved braking mechanism.

Fig. 2 is a vertical sectional view of the same taken on the line 2—2 of Fig. 1.

Fig. 3 is a similar view taken on line 3—3 of Fig. 1.

Fig. 4 is a transverse vertical sectional view on the line 4—4 of Fig. 1, and with certain parts eliminated to facilitate illustration.

Referring to the drawings, 5 and 6 designate respectively four-wheel truck units, each comprising wheels 7 carrying axles 8. The ends of each pair of axles are journalled in boxes 9 of side frames 10.

Each pair of opposite side frames is associated with and carries a transverse bolster 11. These bolsters have top bearings 12 to turnably support the ends 13 of a span bolster 14. The latter has a center bearing 15 at its top for use in supporting the body of the vehicle (not shown).

In accordance with the present invention, brake shoes 16 cooperate with the wheels for braking the truck. Each shoe is associated with a brake head 17 and the heads are in turn connected with brake beams 18, 19, 20 and 21. Each beam is carried by brake hangers 22 having their upper ends suspended from brackets 23 rigidly united with the side frames 10.

The beams are moved in the proper directions to apply the brakes by the following mechanism.

A pressure fluid or air cylinder 24 is secured (Fig. 4) to an inclined bracket 25 arranged at the bottom of the medial portion of the span bolster. A piston (not shown) in the cylinder acts to force a piston rod 26 (Fig. 3) outwardly, and the rod is pivotally connected to the lower end portion of a lever 27 which is pivotally supported at its upper end by a bracket 28 rigidly united with one of the medial cross arms 29 of the span bolster.

A substantially horizontal link 30 connects the medial portion of the lever 27 to the outer end of a link 31 which has its medial portion pivotally connected to a link 32. The latter is substantially horizontally disposed and slidably supported by a bracket 33 rigidly united with the span bolster. Such link, as best shown in Fig. 1, is pivotally connected to the medial portion of a lever 34, pivotally supported at its lower end by a bracket 35 rigidly united with one of the end cross arms 36 of the span bolster. The upper end of the lever 34 is pivotally connected at 37 to one end of a link 38; the opposite end of the link being pivotally connected to the upper end of a lever 39 that is pivotally connected at its lower end to the brake beam 21. At this point it will be obvious that if the piston rod 26, in Fig. 3, is moved toward the left, it will cause the lever 39 to operate the brake beam 21 and apply the brake shoes to the wheels at one end of the truck.

In order to apply the brakes to the medial wheels at the same end portion of the truck, the medial portion of the lever 39 is connected to a link 40 which has its opposite end pivotally connected at 41 to the medial portion of a lever 42. The latter has its lower end (Fig. 3) pivotally connected at 43 to the brake beam 20, and its upper end dead-ended adjustably to a bracket 44, that is pivotally connected at 45 to one of the transverse bolsters 11.

For the purpose of simultaneously applying the brakes to the wheels of the unit 5 of the trucks, the inner end of the lever 31 is pivotally connected at 46 to a longitudinally extending rod or link 47 which in turn is connected to the upper end of a lever 48; the lower end of the latter being pivotally connected at 49 to the brake beam 18. A link 50 connects the medial portion of the lever 48 to the medial portion of a lever 51 which has its lower end connected to the brake beam 19 and its upper end dead-ended to a bracket 52 which is similar to the bracket 44, and is connected to the other one of the transverse bolsters. From the above it will be apparent that each time the piston rod of the air cylinder moves outwardly, the shoes will be applied to all of the wheels of the truck.

For emergency purposes we have provided auxiliary means to allow the brakes to be applied by hand if necessary. For this purpose the lower end of the lever 27 is connected by a link 53 to one end of a transverse lever 54, the latter being pivotally supported at its medial portion by a bracket 55 rigidly united with the bottom of the span bolster. The opposite end of the transverse lever (Figs. 1 and 4) is connected by a link 56 to the lower end of a hand-operated lever 57, the latter being pivotally supported intermediate its ends by a bracket 58 rigidly united with one of the medial cross arms 59 of the span bolster. If the lever 57 is moved in a counter-clockwise direction (Fig. 3), it will, of course, cause the same operations as the forward movement of the piston rod 26.

From Fig. 4, it will be apparent that the transverse bolsters have openings 60 to accommodate movements of the links 40, 50 and that the ends of the span bolster having recesses or the like 61 to accommodate movement of the links 38, and 47.

While we have disclosed what we now consider to be a preferred embodiment of the invention in such manner that the same can be readily understood by those skilled in the art, we are aware that changes can be made in the details illustrated without departing from the spirit of the invention as expressed in the claims.

What we claim and desire to secure by Letters Patent is:

1. In a railway car truck of the plural unit type and having a span bolster, of braking mechanism for the wheels of one unit comprising oppositely movable brake beams, a first lever having one of its ends dead-ended to the truck and its other end connected to one of said beams, a second lever having one of its ends connected to the other beam, a link connecting the medial portions of said levers, a pressure fluid cylinder carried by said span bolster, a piston rod associated with the cylinder, and means operatively connecting the piston rod to the other end of the second lever, the last-mentioned means including a lever having one of its ends pivotally connected to the span bolster and its opposite end connected to the piston rod.

2. In a railway car truck of the plural unit type and having a span bolster, of braking mechanism for the wheels of one unit comprising oppositely movable brake beams, a first lever having one of its ends dead-ended to the truck and its other end connected to one of said beams, a second lever having one of its ends connected to the other beam, a link connecting the medial portions of said levers, a pressure fluid cylinder carried by said span bolster, a piston rod associated with the cylinder, and means operatively connecting the piston rod to the other end of the second lever, the last-mentioned means comprising a third lever having one of its ends pivotally connected to the span bolster and its opposite end connected to the piston rod, and a series of links and levers connecting the medial portion of the third lever to said second lever.

3. In a railway car truck, a wheeled unit, brake shoes cooperating with the wheels of the unit, brake beams operatively connected with the shoes, a transverse bolster, a bracket carried by said bolster, a first lever having its upper end pivotally connected to the bracket and its lower end connected to one of the beams, a lever having its lower end connected to the other beam, a link connecting the medial portions of said levers, a span bolster supported by the transverse bolster and having a bracket, a third lever having one of its ends pivotally connected to the last-mentioned bracket, a link connecting the other end of the third lever to the upper end of the second lever, and means for actuating the third lever to apply the shoes to the wheels, the last-mentioned means comprising a fourth lever having one of its ends pivotally connected to the span bolster, and means for actuating its opposite end.

4. In a railway car truck of plural unit type and including a span bolster, braking mechanism for the wheels of the units comprising a series of links and levers, a pressure fluid cylinder carried by the span bolster, and a substantially vertical cylinder lever fulcrumed at its upper end to said span bolster, pivotally connected at its lower end to said cylinder, and pivotally connected at its medial portion to said series of links and levers.

5. In a railway car truck of plural unit type and including a span bolster, braking mechanism for the wheels of the units comprising a series of links and levers, a pressure fluid cylinder extending longitudinally of the truck and carried by the middle portion of the span bolster to one side of the longitudinal center line of the truck, a piston rod associated with the cylinder, and a substantially vertical lever fulcrumed at its upper end to said span bolster, pivotally connected at its lower end to said piston rod, and pivotally connected at its medial portion to said series of links and levers.

6. In a railway car truck of plural unit type and including a span bolster, braking mechanism for the wheel of the units comprising a brake beam, a lever having its lower end connected to the beam, a series of links and levers connected to said lever, a pressure fluid cylinder carried by the medial portion of the span bolster, a piston rod associated with the cylinder, and a substantially vertical cylinder lever fulcrumed at its upper end to said span bolster, pivotally connected at its lower end to said cylinder and pivotally connected at its medial portion to said series of links and levers.

7. In a railway car truck of plural unit type and including a span bolster, braking mechanism for the wheels of the units comprising a brake beam, a lever having its lower end connected to said beam, the upper end of the lever being dead-ended to a portion of the truck, a series of links and levers connected to the middle portion of said lever, a pressure fluid cylinder carried by the span bolster, a piston rod associated with the cylinder, and a substantially vertical cylinder lever fulcrumed at its upper end to said span bolster, pivotally connected at its lower end to said piston rod and pivotally connected at its medial portion to said series of links and levers.

8. In a railway car truck of plural unit type and including a span bolster, braking mechanism for the wheels of the units comprising oppositely movable brake beams, a first lever having one of its ends dead-ended to the truck and its other end connected to one of said beams, a second lever having one of its ends connected to the other beam, a link connecting the medial portions of said levers, a pressure fluid cylinder carried by the span bolster, a piston rod associated with the cylinder, a third substantially vertical lever fulcrumed at its upper end to said span bolster and pivoted at its lower end to said piston rod, and means including a series of links and levers connecting the medial portion of the third lever to the other end of the second lever.

9. In a railway car truck of plural unit type and including a span bolster having end portions pivotally mounted on the units for movement about vertical axes, braking mechanism for the wheels of the units comprising a series of links and levers, a substantially vertical lever fulcrumed at its upper end to the medial portion of the span bolster to one side of the longitudinal center line of the truck, the medial portion of said lever being connected to said series of links and levers, and means arranged at the middle portion of the span bolster and operatively connected to the lower end portion of said substantially vertical lever for actuating said braking mechanism.

10. In a railway car truck, a plurality of wheel-supported units having transverse bolsters, a span bolster having its end portions pivotally mounted on the medial portions of the transverse bolsters for movement about vertical axes, braking mechanism for the wheels of each unit, a pressure fluid cylinder secured to the bottom of the span bolster about midway the ends thereof and arranged at one side of the longitudinal axis of the truck, a piston rod operatively connected with the cylinder, a lever depending from a portion of the span bolster adjacent to said cylinder and having an upper end pivotally connected to the span bolster, means pivotally connecting the lower end of said lever to said piston rod, and means operatively connecting the medial portion of the lever to said braking mechanism.

HARRY W. STERTZBACH.
HARRY A. MOELLER.